United States Patent
Yamaguchi

(10) Patent No.: US 11,370,520 B1
(45) Date of Patent: Jun. 28, 2022

(54) VESSEL STEERING SYSTEM AND VESSEL STEERING METHOD

(71) Applicant: YAMAHA HATSUDOKI KABUSHIKI KAISHA, Iwata (JP)

(72) Inventor: Kohei Yamaguchi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 357 days.

(21) Appl. No.: 16/827,839

(22) Filed: Mar. 24, 2020

Related U.S. Application Data

(60) Provisional application No. 62/823,108, filed on Mar. 25, 2019.

(51) Int. Cl.
| | |
|---|---|
| *B63H 25/42* | (2006.01) |
| *B63H 20/12* | (2006.01) |
| *G05D 1/02* | (2020.01) |
| *G05D 1/08* | (2006.01) |
| *B63H 20/00* | (2006.01) |
| *B63H 25/02* | (2006.01) |

(52) U.S. Cl.
CPC ............ *B63H 25/42* (2013.01); *B63H 20/12* (2013.01); *G05D 1/0208* (2013.01); *G05D 1/0875* (2013.01); *B63H 2020/003* (2013.01); *B63H 2025/026* (2013.01)

(58) Field of Classification Search
CPC .. B63H 25/42; B63H 20/12; B63H 2020/003; B63H 2025/026; G05D 1/0208; G05D 1/0875
See application file for complete search history.

(56) References Cited

U.S. PATENT DOCUMENTS 8,589,004 B1    11/2013   Kanno

FOREIGN PATENT DOCUMENTS

| JP | 2014-073700 A | 4/2014 | |
|---|---|---|---|
| WO | WO-2018086714 A1 * | 5/2018 | ............ B63B 34/05 |

* cited by examiner

*Primary Examiner* — Stephen P Avila
(74) *Attorney, Agent, or Firm* — Keating and Bennett, LLP

(57) ABSTRACT

In a vessel steering system including three or more propulsion devices, unintentional turning of a vessel is prevented when the vessel moves in an oblique direction. When a tilt direction of a joystick is an oblique direction between a longitudinal direction and a lateral direction, a controller is configured or programmed to correct at least one steering angle of a left propulsion device, a right propulsion device, and a central propulsion device so that a resultant force of propulsive forces of the left propulsion device, the right propulsion device, and the central propulsion device acts in a direction passing through a center of gravity of the vessel.

14 Claims, 13 Drawing Sheets

VESSEL STEERING SYSTEM AND VESSEL STEERING METHOD

CROSS REFERENCE TO RELATED APPLICATIONS

This application claims the benefit of priority to U.S. Patent Application No. 62/823,108 filed on Mar. 25, 2019. The entire contents of this application are hereby incorporated herein by reference.

BACKGROUND OF THE INVENTION

1. Field of the Invention

The present invention relates to a vessel steering system and method.

2. Description of the Related Art

Conventionally, a vessel steering system that operates the forward, backward, left, and right movement of a vessel with a joystick is known. For example, in Japanese Laid-open Patent Publication No. 2014-73700, a vessel includes a left outboard motor, a right outboard motor, and a central outboard motor. When the joystick is tilted in the lateral direction, the vessel controller controls the left outboard motor, the right outboard motor, and the central outboard motor in the lateral movement mode. In the lateral movement mode, the controller sets the steering angle of the left outboard motor and the steering angle of the right outboard motor in directions opposite to each other in the lateral direction and inclined with respect to the longitudinal direction of the vessel, and sets the steering angle of the central outboard motor in a same direction as the steering angle of the left outboard motor or the right outboard motor. Then, the controller controls the left outboard motor, the right outboard motor, and the central outboard motor so that the resultant force of the propulsive forces of the left outboard motor, the right outboard motor, and the central outboard motor acts in the lateral direction of the vessel. As a result, the vessel moves in the lateral direction.

In the above-described vessel steering system, when the joystick is tilted in the oblique direction between the longitudinal direction and the lateral direction, the controller controls the propulsive forces of the left outboard motor, the right outboard motor, and the central outboard motor so that the resultant force of the propulsive forces acts obliquely. In this case, the action line of the resultant force of the propulsive forces deviates from the center of gravity of the vessel. As a result, the vessel moves in the oblique direction while turning unintentionally and undesired by the user. Such a problem of unintentional turning occurs particularly in a vessel steering system including three or more propulsion devices.

SUMMARY OF THE INVENTION

Preferred Embodiments of the Present Invention prevent unintentional turning of a vessel when the vessel moves in an oblique direction in a vessel steering system including three or more propulsion devices.

A vessel steering system according to a preferred embodiment of the present invention includes a left propulsion device, a left actuator, a right propulsion device, a right actuator, a central propulsion device, a central actuator, a joystick, and a controller. The left actuator is connected to the left propulsion device to change a steering angle of the left propulsion device. The right actuator is connected to the right propulsion device to change a steering angle of the right propulsion device. The central propulsion device is disposed between the left propulsion device and the right propulsion device. The central actuator is connected to the central propulsion device to change a steering angle of the central propulsion device. The joystick is operable in a tiltable manner. The controller is configured or programmed to receive a signal indicative of a tilt direction of the joystick.

When the joystick is tilted in a lateral direction, the controller is configured or programmed to control the left propulsion device, the right propulsion device, and the central propulsion device as follows. The controller sets the steering angle of the left propulsion device and the steering angle of the right propulsion device in directions opposite to each other in the lateral direction and inclined with respect to the longitudinal direction of the vessel. The controller sets the steering angle of the central propulsion device in a predetermined direction. The controller controls the left propulsion device, the right propulsion device, and the central propulsion device so that a direction of a resultant force of propulsive forces of the left propulsion device, the right propulsion device, and the central propulsion device corresponds to the tilt direction of the joystick. When the tilt direction of the joystick is an oblique direction between the longitudinal direction and the lateral direction, the controller corrects at least one steering angle of the left propulsion device, the right propulsion device, and the central propulsion device so that the resultant force of the propulsive forces of the left propulsion device, the right propulsion device, and the central propulsion device acts in a direction passing through a center of gravity of the vessel.

A method according to a preferred embodiment of the present invention is performed by a controller to steer a vessel. The vessel includes a left propulsion device, a right propulsion device, and a central propulsion device. The central propulsion device is disposed between the left propulsion device and the right propulsion device. The method includes the following processes. A first process is to receive a signal indicative of a tilt direction of a joystick to steer the vessel. A second process is to perform the following process when the joystick is tilted in a lateral direction. The second process includes setting a steering angle of the left propulsion device and a steering angle of the right propulsion device in directions opposite to each other in the lateral direction and inclined with respect to a longitudinal direction of the vessel. The second process includes setting a steering angle of the central propulsion device in a predetermined direction. The second process includes controlling propulsive forces of the left propulsion device, the right propulsion device, and the central propulsion device so that a direction of a resultant force of the propulsive forces of the left propulsion device, the right propulsion device, and the central propulsion device corresponds to the tilt direction of the joystick. A third process is to correct at least one steering angle of the left propulsion device, the right propulsion device, and the central propulsion device so that the resultant force of the propulsive forces of the left propulsion device, the right propulsion device, and the central propulsion device acts in a direction passing through a center of gravity of the vessel when the tilt direction of the joystick is an oblique direction between the longitudinal direction and the lateral direction.

According to preferred embodiments of the present invention, in vessel steering systems each including three or more propulsion devices, unintentional turning of the vessel is prevented when the vessel moves in an oblique direction.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
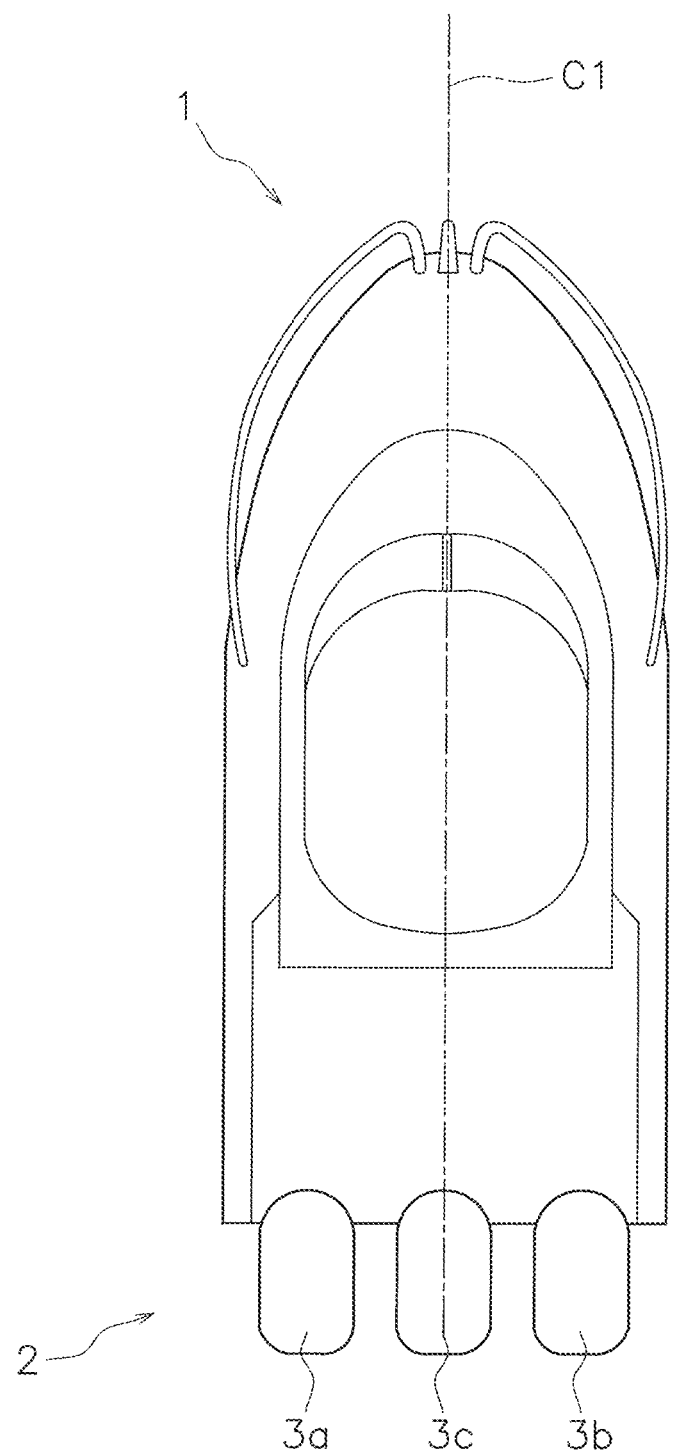
FIG. 1 is a top view of a vessel according to a preferred embodiment of the present invention.

Hereinafter, preferred embodiments will be described with reference to the drawings. FIG. 1 is a top view showing a vessel 1 according to a preferred embodiment of the present invention. The vessel 1 includes a vessel steering system 2 according to a preferred embodiment of the present invention. As illustrated in FIG. 1, the vessel steering system 2 includes a plurality of propulsion devices 3a to 3c. The propulsion devices 3a to 3c are outboard motors, for example. Specifically, the vessel 1 includes a left propulsion device 3a, a right propulsion device 3b, and a central propulsion device 3c. In the following description, the front, rear, left, right, up, and down directions mean the front, rear, left, right, up, and down directions of the vessel 1.

The propulsion devices 3a to 3c are attached to the stern of the vessel 1. The propulsion devices 3a to 3c are arranged side by side in the width direction of the vessel 1. Specifically, the left propulsion device 3a is disposed on the left side of the center line C1 extending in the longitudinal direction of the vessel 1. The right propulsion device 3b is disposed to the right of the center line C1. The central propulsion device 3c is disposed between the left propulsion device 3a and the right propulsion device 3b. Each of the propulsion devices 3a to 3c generates a propulsive force that propels the vessel 1.

Figure 2:
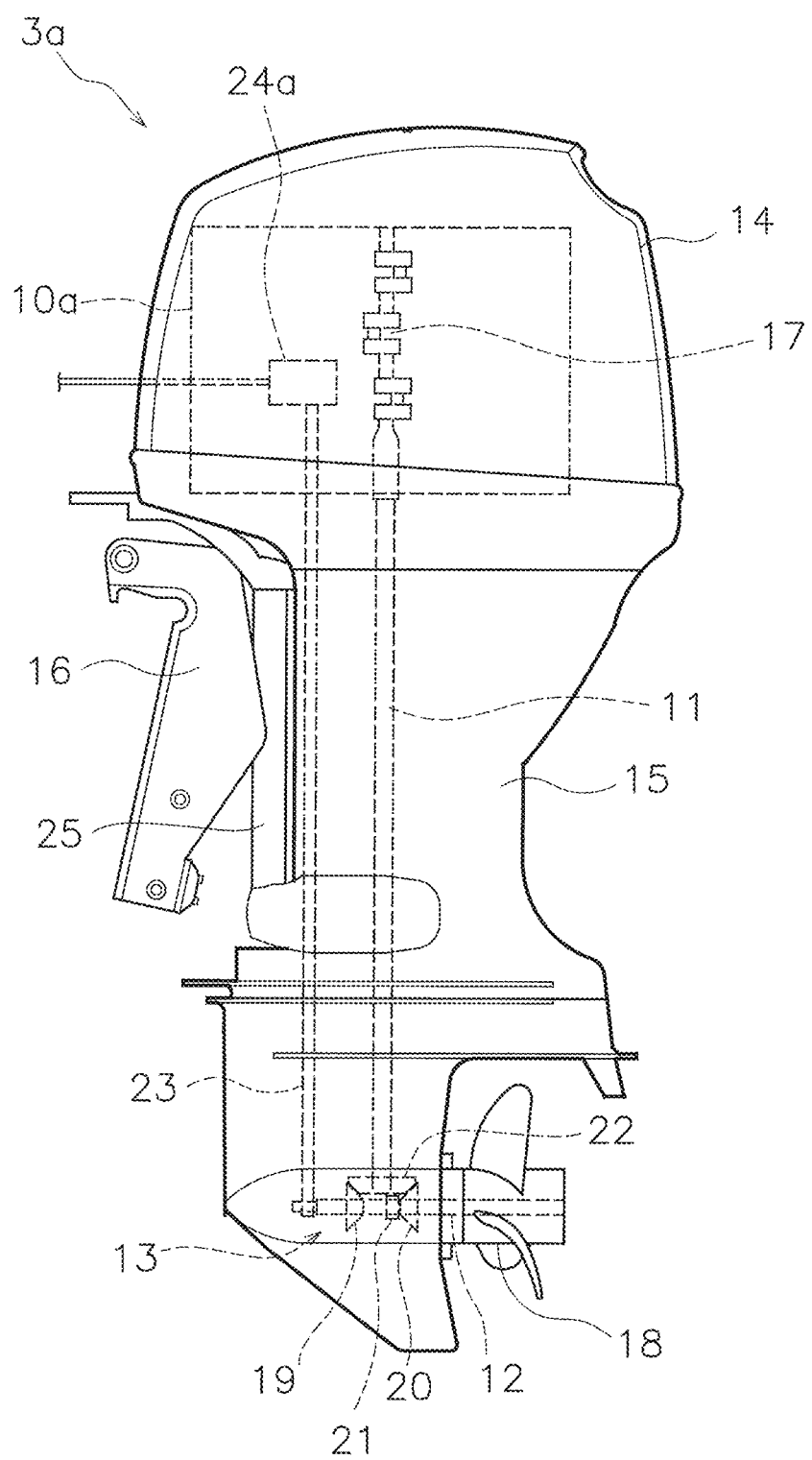
FIG. 2 is a side view of a left propulsion device.

FIG. 2 is a side view of the left propulsion device 3a. The left propulsion device 3a includes an engine 10a, a drive shaft 11, a propeller shaft 12, a shift mechanism 13, an engine cowl 14, a housing 15, and a bracket 16.

The engine 10a generates a propulsive force that propels the vessel 1. The engine 10a is disposed in the engine cowl 14. The engine 10a includes a crankshaft 17. The crankshaft 17 extends in the vertical direction. The drive shaft 11 is connected to the crankshaft 17. The drive shaft 11 extends downward from the engine 10a. The propeller shaft 12 extends in a direction intersecting with the drive shaft 11. The propeller shaft 12 extends in the longitudinal direction. The propeller shaft 12 is connected to the drive shaft 11 via the shift mechanism 13. A propeller 18 is connected to the propeller shaft 12.

The housing 15 is disposed below the engine cowl 14. The drive shaft 11, the propeller shaft 12, and the shift mechanism 13 are disposed in the housing 15. The shift mechanism 13 switches the rotational direction of the power transmitted from the drive shaft 11 to the propeller shaft 12. The shift mechanism 13 includes a forward gear 19, a reverse gear 20, and a clutch 21. The forward gear 19 and the reverse gear 20 mesh with the bevel gear 22. The bevel gear 22 is attached to the drive shaft 11. The clutch 21 selectively engages the forward gear 19 and the reverse gear 20 with the propeller shaft 12. The clutch 21 moves to a forward position, a reverse position, and a neutral position.

The clutch 21 engages the forward gear 19 and the propeller shaft 12 at the forward position. Accordingly, the rotation of the drive shaft 11 is transmitted to the propeller shaft 12 so as to rotate the propeller shaft 12 in the forward direction. The clutch 21 engages the reverse gear 20 and the propeller shaft 12 at the reverse position. Thus, the rotation of the drive shaft 11 is transmitted to the propeller shaft 12 so as to rotate the propeller shaft 12 in the reverse direction. When the clutch 21 is in the neutral position, both the forward gear 19 and the reverse gear 20 are released from the propeller shaft 12. Therefore, the rotation of the drive shaft 11 is not transmitted to the propeller shaft 12.

The left propulsion device 3a includes a shift member 23 and a shift actuator 24a. The shift member 23 is connected to the shift mechanism 13. The shift member 23 is configured to operate the shift mechanism 13. Specifically, the shift member 23 is connected to the clutch 21. The shift member 23 is driven by the shift actuator 24a to move the clutch 21 to the forward movement position, the reverse movement position, and the neutral position. The shift actuator 24a is connected to the shift member 23. The shift actuator 24a drives the shift member 23. The shift actuator 24a is, for example, an electric motor. The shift actuator 24a drives the shift member 23 to switch the clutch 21 to the forward position, the reverse position, and the neutral position.

The bracket 16 attaches the left propulsion device 3a to the vessel 1. The left propulsion device 3a is detachably fixed to the stern of the vessel 1 through the bracket 16. The bracket 16 includes a steering shaft 25. The left propulsion device 3a is supported by the bracket 16 so as to be rotatable about the steering shaft 25.

Figure 3:
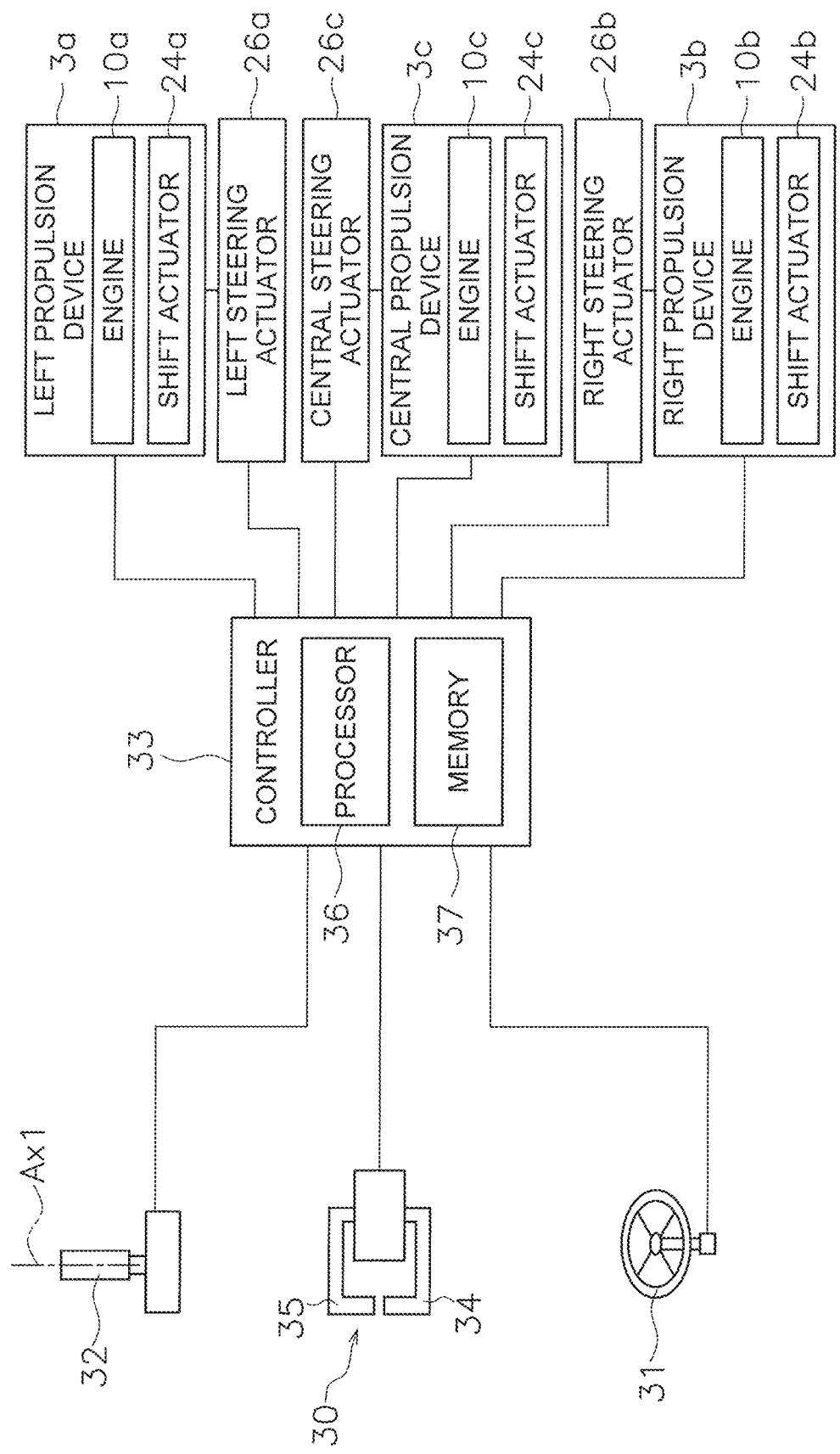
FIG. 3 is a schematic diagram showing a configuration of a vessel steering system according to a preferred embodiment of the present invention.

FIG. 3 is a schematic diagram showing the configuration of the vessel steering system 2. The right propulsion device 3b and the central propulsion device 3c have the same configuration as the left propulsion device 3a. For example, as illustrated in FIG. 3, the right propulsion device 3b includes an engine 10b and a shift actuator 24b. The engine 10b and the shift actuator 24b of the right propulsion device 3b have the same configuration as the engine 10a and the shift actuator 24a of the left propulsion device 3a, respectively. The central propulsion device 3c includes an engine 10c and a shift actuator 24c. The engine 10c and the shift actuator 24c of the central propulsion device 3c have the same configuration as the engine 10a and the shift actuator 24a of the left propulsion device 3a, respectively.

As illustrated in FIG. 3, the vessel steering system 2 includes a left steering actuator 26a, a right steering actuator 26b, and a central steering actuator 26c. The left steering actuator 26a is connected to the left propulsion device 3a. The left steering actuator 26a rotates the left propulsion device 3a around the steering shaft 25. Thus, the left steering actuator 26a changes the steering angle of the left propulsion device 3a. The left steering actuator 26a includes, for example, a hydraulic cylinder. Alternatively, the left steering actuator 26a may include an electric cylinder or an electric motor.

The right steering actuator 26b is connected to the right propulsion device 3b. The right steering actuator 26b changes the steering angle of the right propulsion device 3b. The central steering actuator 26c is connected to the central propulsion device 3c. The central steering actuator 26c changes the steering angle of the central propulsion device 3c. The right steering actuator 26b and the central steering actuator 26c have the same configuration as the left steering actuator 26a.

As illustrated in FIG. 3, the vessel steering system 2 includes a remote control device 30, a steering device 31, a joystick 32, and a controller 33.

The remote control device 30 includes a first operation member 34 and a second operation member 35. The first operation member 34 is operated by a user to control the left propulsion device 3a. The first operation member 34 is, for example, a lever. The first operation member 34 is able to be operated to a forward position, a reverse position, and a neutral position. The remote control device 30 transmits a signal indicative of the operation of the first operation member 34 to the controller 33.

The second operation member 35 is operated by a user to control the right propulsion device 3b. The second operation member 35 has the same configuration as the first operation member 34. The remote control device 30 transmits a signal indicative of the operation of the first operation member 34 to the controller 33. The remote control device 30 transmits a signal indicative of the operation of the second operation member 35 to the controller 33.

The steering device 31 is, for example, a steering wheel. The steering device 31 is operated by a user in order to control the steering angles of the propulsion devices 3a to 3c. The steering device 31 is able to be operated to a left turn position, a right turn position, and a neutral position. The steering device 31 transmits a signal indicative of the position of the steering device 31 to the controller 33.

The joystick 32 is operable in a tiltable manner. The joystick 32 is operated in the front-rear, left-right, and diagonal directions therebetween. The joystick 32 is operable 360 degrees in all directions around the rotation axis Ax1 of the joystick 32. The joystick 32 transmits a signal indicative of the position of the joystick 32 to the controller 33. The position of the joystick 32 indicates the tilt direction and the operation amount of the joystick 32. The operation amount of the joystick 32 is a tilt amount of the joystick 32.

The controller 33 includes a processor 36 and a memory 37. The memory 37 includes volatile memory such as RAM. The memory 37 includes a nonvolatile memory such as a ROM. The controller 33 may include an auxiliary storage device such as a hard disk or an SSD. The memory 37 stores a program and data to control the propulsion devices 3a to 3c and the steering actuators 26a to 26c. The processor 36 is, for example, a CPU (Central Processing Unit), and executes processes to control the propulsion devices 3a to 3c and the steering actuators 26a to 26c according to the program.

The controller 33 controls the propulsion devices 3a to 3c and the steering actuators 26a to 26c based on signals from the steering device 31, the remote control device 30, and the joystick 32. Specifically, the controller 33 controls the direction and magnitude of the propulsive force of the left propulsion device 3a according to the position of the first operation member 34. The controller 33 controls the shift actuator 24a according to the position of the first operation member 34. As a result, the clutch 21 of the shift mechanism 13 is switched between the forward position, the reverse position, and the neutral position. As a result, the propulsive force of the left propulsion device 3a is switched between forward, reverse, and neutral. Further, the controller 33 controls the magnitude of the propulsive force of the left propulsion device 3a in accordance with the position of the first operation member 34. The controller 33 controls the magnitude of the propulsive force of the left propulsion device 3a by controlling the throttle opening of the engine 10a, for example.

The controller 33 controls the direction and magnitude of the propulsive force of the right propulsion device 3b according to the position of the second operation member 35. The controller 33 controls the shift actuator 24b according to the position of the second operation member 35. Thus, similar to the left propulsion device 3a, the propulsive force of the right propulsion device 3b is switched between forward, reverse, and neutral. Further, the controller 33 controls the magnitude of the propulsive force of the right propulsion device 3b according to the position of the second operation member 35. The controller 33 controls the magnitude of the propulsive force of the right propulsion device 3b, for example, by controlling the throttle opening of the engine 10b. The controller 33 may control the shift and the propulsive force of the central propulsion device 3c according to the operation of the first operation member 34 or the second operation member 35.

The controller 33 controls the steering actuators 26a to 26c in accordance with the position of the steering device 31. Thus, the steering angles of the propulsion devices 3a to 3c are controlled. As a result, the turning direction of the vessel 1 is controlled.

The controller 33 controls the propulsion devices 3a to 3c and the steering actuators 26a to 26c according to the position of the joystick 32. Specifically, the controller 33 controls the propulsive forces and the steering angles of the propulsion devices 3a to 3c so that the vessel 1 translates in a direction corresponding to the tilt direction of the joystick 32. Hereinafter, the vessel steering control of the vessel 1 by the operation of the joystick 32 will be described in detail.

When the tilt direction of the joystick 32 includes a vector in a lateral direction, the controller 33 controls the propulsion devices 3a to 3c and the steering actuators 26a to 26c in a lateral movement mode. In the lateral movement mode, the controller 33 makes the steering angle of the left propulsion device 3a and the steering angle of the right propulsion device 3b opposite to each other in the lateral direction and inclined by a predetermined angle with respect to the longitudinal direction. Further, the controller 33 tilts the central propulsion device 3c in the same direction as the left propulsion device 3a or the right propulsion device 3b. The controller 33 controls the propulsive forces of the left propulsion device 3a, the propulsion device 3b, and the central propulsion device 3c so that the direction of the resultant force of the propulsive forces of the left propulsion device 3a, the right propulsion device 3b, and the central propulsion device 3c corresponds to the tilt direction of the joystick 32.

Figure 4:
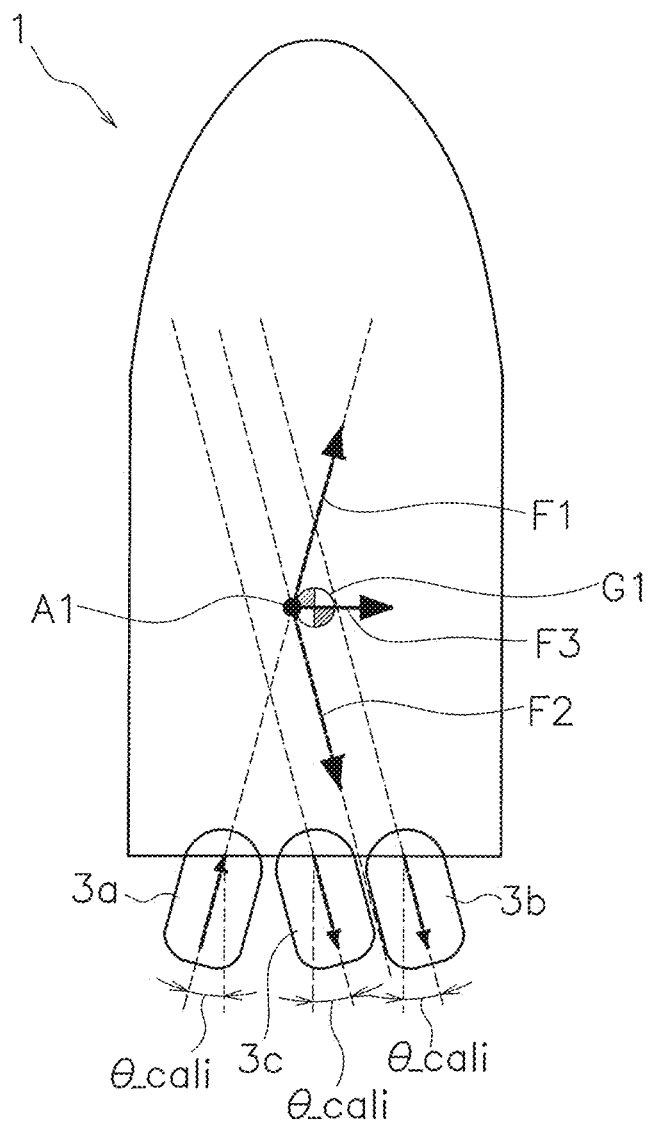
FIG. 4 is a diagram showing propulsive forces of propulsion devices when a tilt direction of a joystick is rightward.

FIG. 4 shows the propulsive forces of the propulsion device 3a to 3c when the tilt direction of the joystick 32 is rightward. As illustrated in FIG. 4, in the lateral movement mode, the controller 33 tilts the left propulsion device 3a and the right propulsion device 3b by a predetermined angle $\theta\_cali$ in the toe-in direction with respect to the longitudinal direction.

The predetermined angle $\theta\_cali$ is a steering angle of the left propulsion device 3a, the right propulsion device 3b, and the central propulsion device 3c that moves the vessel in the lateral direction. That is, when the tilt direction of the joystick 32 is rightward or leftward, The predetermined angle $\theta\_cali$ is set so that the resultant force F3 of the propulsive forces of the left propulsion device 3a, the right propulsion device 3b, and the central propulsion device 3c acts in a direction passing through the center of gravity G1 of the vessel 1. The controller 33 acquires and stores in advance a predetermined angle $\theta\_cali$ as a calibration angle. The controller 33 may acquire the calibration angle $\theta\_cali$ by the user calibrating an operation of the joystick 32 and the steering angle of the left propulsion device 3a, the right propulsion device 3b, and the central propulsion device 3c. Alternatively, the controller 33 may acquire the calibration angle $\theta\_cali$ from an external device.

When the tilt direction of the joystick 32 is rightward, the controller 33 tilts the central propulsion device 3c in the same direction as the right propulsion device 3b. Further, the controller 33 sets the left propulsion device 3a to move forward and the right propulsion device 3b and the central propulsion device 3c to move backward. In FIG. 4, "F1" is the propulsive force of the left propulsion device 3a, and indicates the forward propulsive force. "F2" is a resultant force of the propulsive forces of the right propulsion device 3b and the central propulsion device 3c, and indicates the rearward propulsive force. The controller makes the propulsive forces of the right propulsion device 3b and the central propulsion device 3c the same magnitude. The resultant force of the propulsive forces of the right propulsion device 3b and the central propulsion device 3c acts on an action line passing through a middle point between an action line of the propulsive force of the right propulsion device 3b and an action line of the propulsive force of the central propulsion device 3c.

The controller 33 makes the forward propulsive force F1 and the rearward propulsive force F2 the same magnitude. Thus, the direction of the resultant force F3 is rightward. As a result, the vessel 1 moves to the right. In addition, as illustrated in FIG. 4, the action point A1 of the resultant force F3 is deviated from the position of the center of gravity G1 of the vessel 1. However, since the resultant force F3 acts in the direction passing through the center of gravity G1, it is possible to prevent a turning force from acting on the vessel 1.

Figure 5:
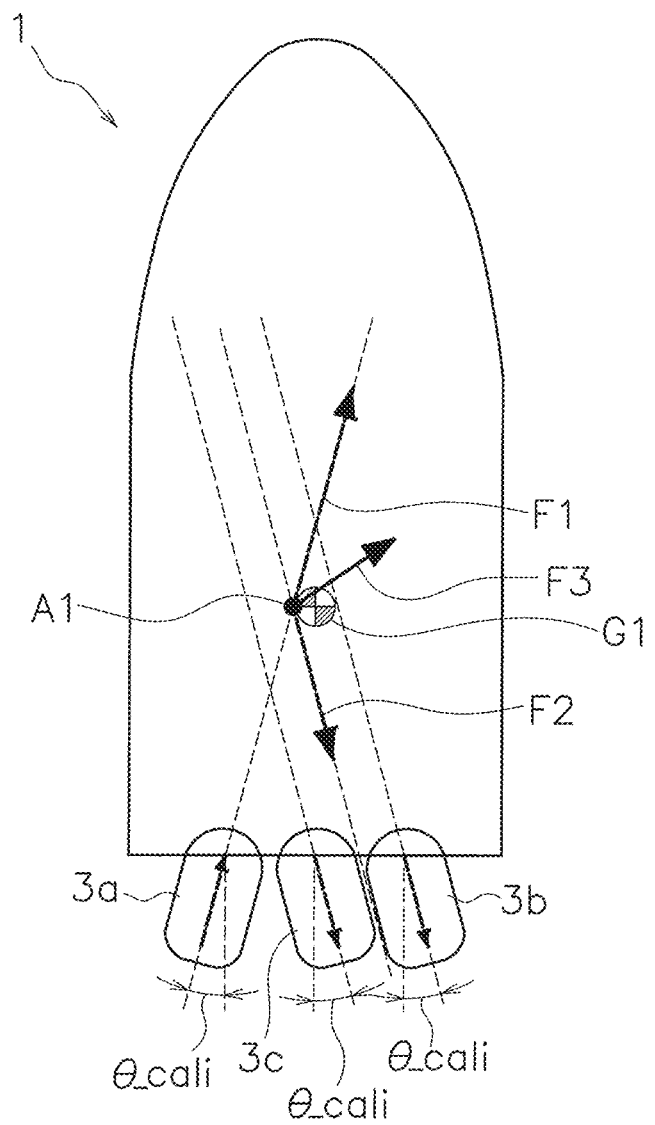
FIG. 5 is a diagram showing the propulsive forces of the propulsion devices when the tilt direction of the joystick is diagonally forward right without correcting a steering angle.

FIG. 5 shows the propulsive forces of the propulsion devices 3a to 3c when the tilt direction of the joystick 32 is diagonally forward right. As illustrated in FIG. 5, the controller 33 makes the forward propulsive force F1 larger than the rearward propulsive force F2. Thus, the direction of the resultant force F3 is diagonally forward right. However, the action point A1 of the resultant force F3 is deviated from the position of the center of gravity G1 of the vessel 1. Further, the action line of the resultant force F3 is deviated from the center of gravity G1. Therefore, a turning force acts on the vessel 1.

Figure 6:
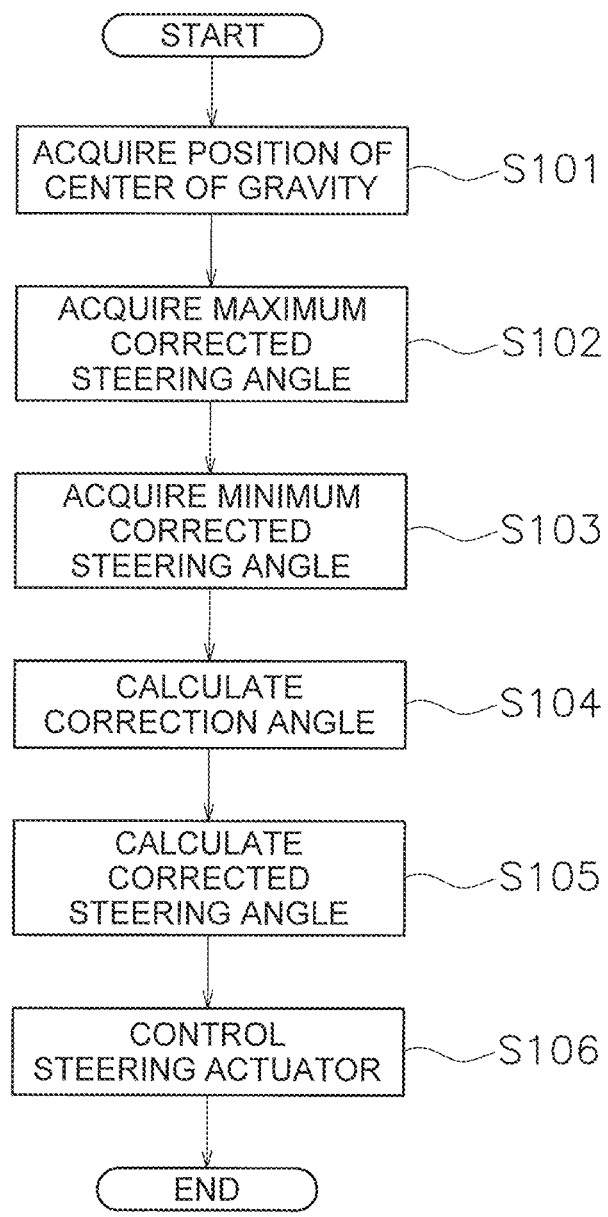
FIG. 6 is a flowchart showing a process to correct the steering angle.

Therefore, the controller corrects the steering angles of the left propulsion device 3a, the right propulsion device 3b, and the central propulsion device 3c so that the resultant force F3 acts in the direction passing through the center of gravity. Hereinafter, processes to correct the steering angle will be described. FIG. 6 is a flowchart showing a process to correct the steering angle.

As illustrated in FIG. 6, in step S101, the controller 33 acquires a position of the center of gravity G1. The controller 33 calculates the position of the center of gravity G1 by the following equation (1).

$$H = \frac{3}{4} \times L / \tan \theta\_cali \quad (1)$$

Figure 7:
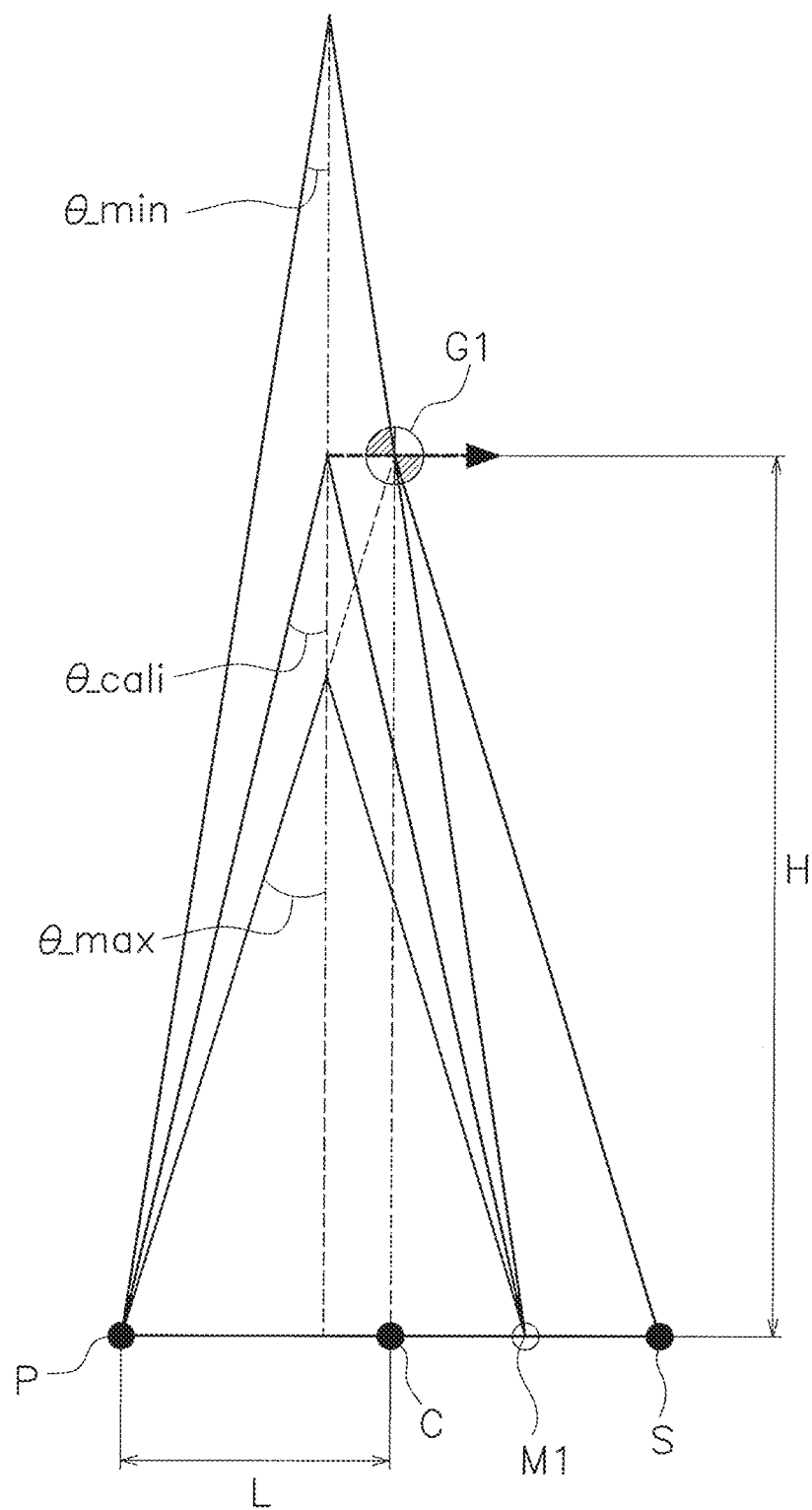
FIG. 7 is a diagram showing a method to determine a maximum corrected steering angle and a minimum corrected steering angle.

Here, as illustrated in FIG. 7, H is a distance in the longitudinal direction from turning centers S, P, C of the propulsion devices 3a to 3c to the center of gravity G1. L is a distance in the left-right direction between the turning center P of the left propulsion device 3a and the turning center C of the central propulsion device 3c.

In step S102, the controller 33 acquires a maximum corrected steering angle. The maximum corrected steering angle is a maximum value of the corrected steering angle. The controller 33 calculates the maximum corrected steering angle $\theta\_max$ by the following equation (2). As illustrated in FIG. 7, the maximum corrected steering angle $\theta\_max$ is a steering angle in a direction from the turning center P of the left propulsion device 3a toward the center of gravity G1.

$$\theta\_max = \text{atan } 2(H, L) \quad (2)$$

In step S103, the controller 33 acquires a minimum corrected steering angle. The minimum corrected steering angle is a minimum value of the corrected steering angle. The controller 33 calculates the minimum corrected steering angle $\theta\_min$ by the following equation (3). As illustrated in FIG. 7, the minimum corrected steering angle $\theta\_min$ is a steering angle in a direction from a middle point M1 toward the center of gravity G1. The middle point M1 is a center position in the left-right direction between the turning center S of the right propulsion device 3b and the turning center C of the central propulsion device 3c.

$$\theta\_min = \text{atan } 2(H, L/2) \quad (3)$$

In step S104, the controller 33 calculates a correction angle. When the tilt direction of the joystick 32 is diagonally forward right, the controller 33 calculates the correction angle $\gamma$ by the following equation (4).

$$\gamma = (90 - |\theta\_joy|) / (90 - \theta\_max) \times (\theta\_max - \theta\_cali) \quad (4)$$

$\theta\_joy$ indicates the tilt direction of the joystick 32. When $\theta\_joy$ is 0 degrees, the tilt direction of the joystick 32 is forward. When $\theta\_joy$ is 90 degrees, the tilt direction of the joystick 32 is rightward or leftward. When $\theta\_joy$ is 180 degrees, the tilt direction of the joystick 32 is backward. When the tilt direction of the joystick 32 is diagonally forward right, $\theta\_joy$ is smaller than 90 degrees. When the tilt direction of the joystick 32 is diagonally rearward right, θ_joy is greater than 90 degrees.

When the tilt direction of the joystick 32 is diagonally rearward right, the controller 33 calculates the correction angle γ by the following equation (5).

$$\gamma = (|\theta\_joy| - 90)/(90 - \theta\_max) \times (\theta\_min - \theta\_cali) \qquad (5)$$

In step S105, the controller 33 calculates the corrected steering angle θ_out by the following equation (6).

$$\theta\_out = \theta\_cali + \gamma \qquad (6)$$

However, when the value calculated from equation (6) is larger than the maximum corrected steering angle θ_max, the controller 33 determines the value of the maximum corrected steering angle θ_max as the corrected steering angle θ_out. Further, when the value calculated from the equation (6) is smaller than the minimum corrected steering angle θ_min, the controller 33 determines the value of the minimum corrected steering angle θ_min as the corrected steering angle θ_out.

In step S106, the controller 33 controls the steering actuators so that the steering angles of the propulsion device 3a to 3c become the corrected steering angle θ_out.

Figure 8:
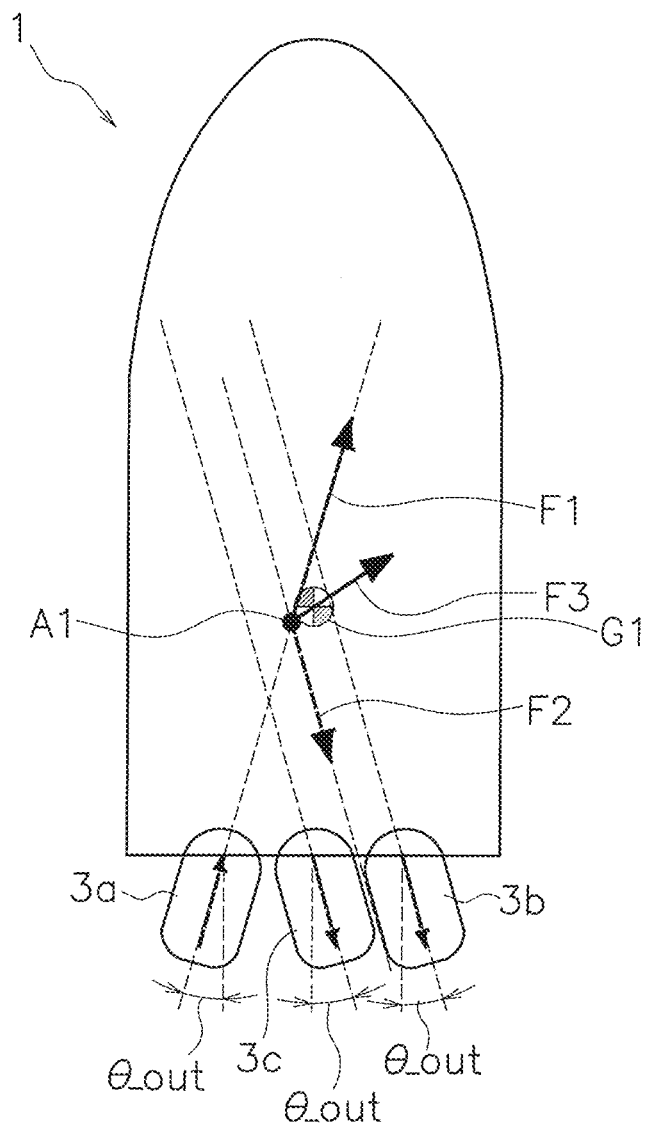
FIG. 8 is a diagram showing the propulsive forces of the propulsion devices when the tilt direction of the joystick is diagonally forward right with the steering angle being corrected.

FIG. 8 is a diagram illustrating the propulsive forces when the tilt direction of the joystick 32 is diagonally forward right. When the tilt direction of the joystick 32 is diagonally forward right, the controller 33 calculates the correction angle γ by the above equation (4). In this case, the correction angle γ is a positive value. Therefore, the corrected steering angle θ_out is a value larger than the calibration angle θ_cali. Thus, as illustrated in FIG. 8, the steering angles of the propulsion device 3a to 3c are corrected to the corrected steering angle θ_out larger than the calibration angle θ_cali so that the resultant force F3 acts in the direction passing through the center of gravity G1.

Figure 9:
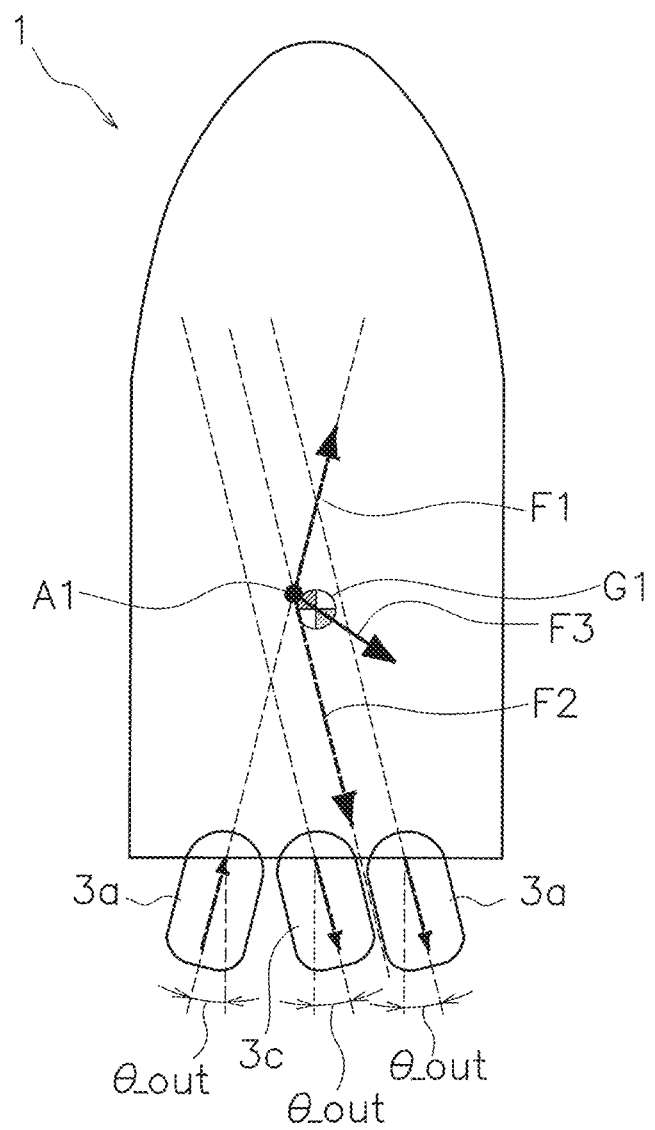
FIG. 9 is a diagram showing the propulsive forces of the propulsion devices when the tilt direction of the joystick is diagonally rearward right with the steering angle being corrected.

FIG. 9 is a diagram showing the propulsive forces when the tilt direction of the joystick 32 is diagonally rearward right. When the tilt direction of the joystick 32 is diagonally rearward right, the controller 33 calculates the correction angle γ by the above equation (5). In this case, the correction angle γ is a negative value. Therefore, the corrected steering angle θ_out is a value smaller than the calibration angle θ_cali. Accordingly, as illustrated in FIG. 9, the steering angles of the propulsion device 3a to 3c are corrected to the corrected steering angle θ_out smaller than the calibration angle θ_cali so that the resultant force F3 acts in the direction passing through the center of gravity G1.

The case in which the tilt direction of the joystick 32 includes a right vector has been described above. When the tilt direction of the joystick 32 includes a left vector, the controller 33 controls the propulsion devices 3a to 3c symmetrically with the above.

Figure 10:
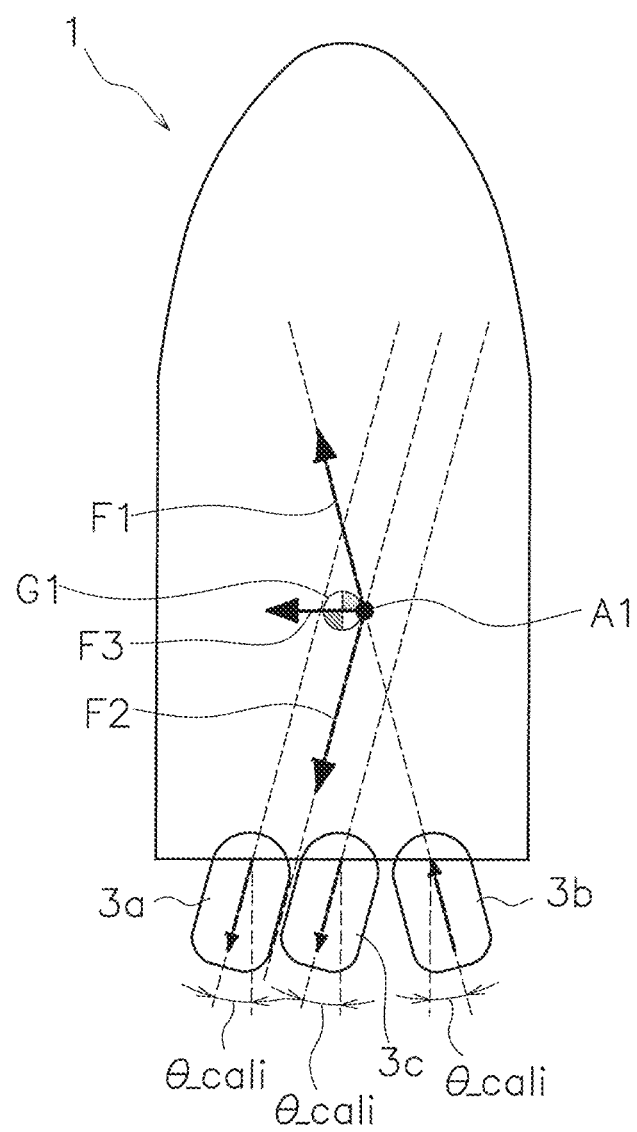
FIG. 10 is a diagram showing the propulsive forces of the propulsion devices when the tilt direction of the joystick is leftward.

FIG. 10 is a diagram illustrating the propulsive forces when the tilt direction of the joystick 32 is leftward. As illustrated in FIG. 10, the controller 33 tilts the left propulsion device 3a and the right propulsion device 3b by a predetermined angle θ_cali in the toe-in direction with respect to the longitudinal direction. The controller 33 sets the steering angle of the central propulsion device 3c in the same direction as the steering angle of the left propulsion device 3a. The controller 33 sets the right propulsion device 3b to move forward and the left propulsion device 3a and the central propulsion device 3c to move backward. The controller 33 makes the forward propulsive force F1 and the rearward propulsive force F2 the same magnitude. Thus, the direction of the resultant force F3 is leftward. As a result, the vessel 1 moves to the left.

Figure 11:
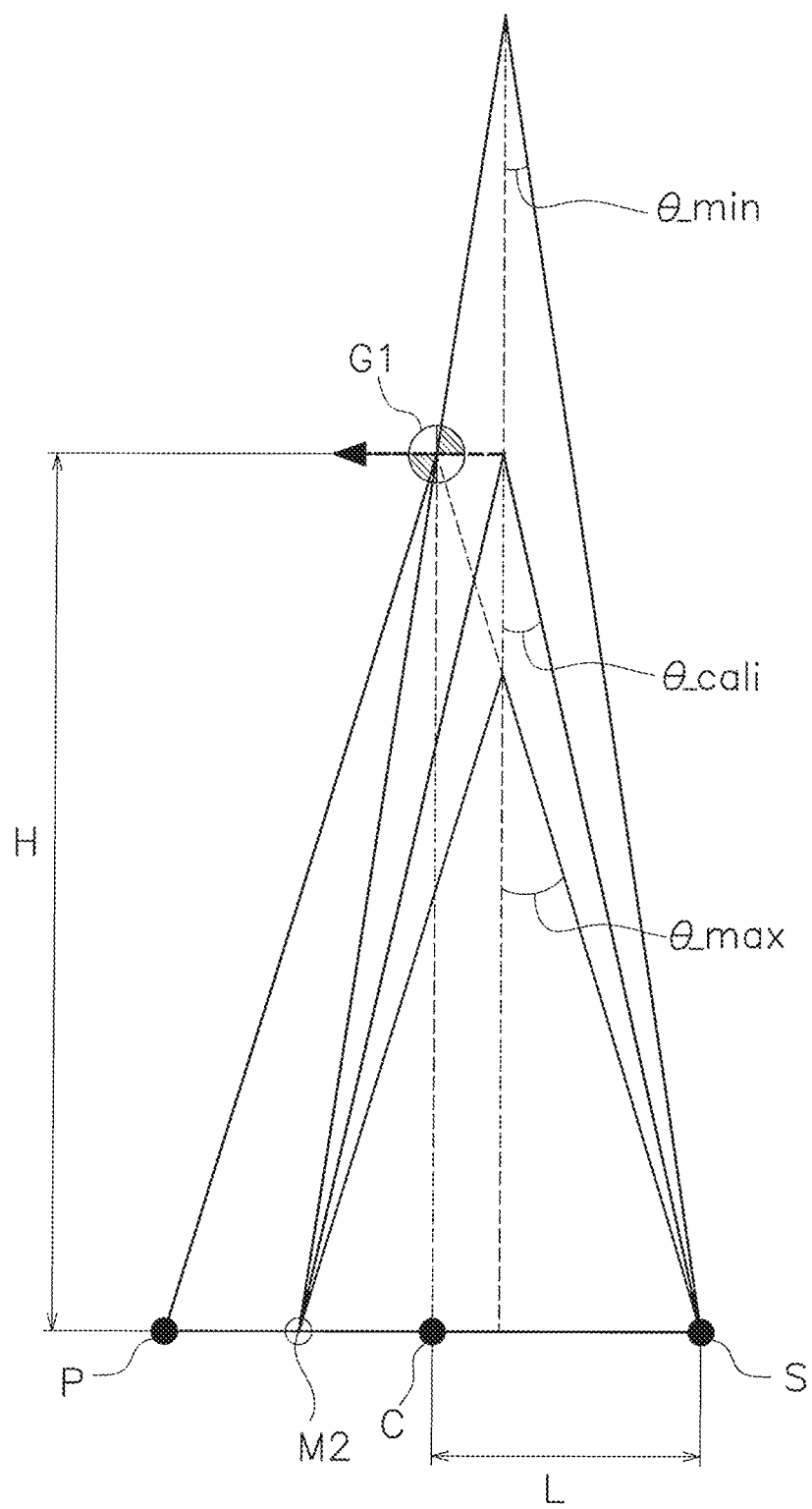
FIG. 11 is a diagram showing a method for determining the maximum corrected steering angle and the minimum corrected steering angle.

When the tilt direction of the joystick 32 is diagonally forward left or diagonally rearward left, the controller 33 corrects the steering angles of the propulsion device 3a to 3c in the same manner as the above-described processes. FIG. 11 is a diagram showing the maximum corrected steering angle θ_max and the minimum corrected steering angle θ_min when the tilt direction of the joystick 32 includes a left vector. As illustrated in FIG. 11, the controller 33 determines the steering angle in the direction from the turning center S of the right propulsion device 3b toward the center of gravity G1 as the maximum corrected steering angle θ_max. The controller 33 determines the steering angle in the direction from the middle point M2 toward the center of gravity G1 as the minimum corrected steering angle θ_min. The middle point M2 is a center position between the turning center P of the left propulsion device 3a and the turning center C of the central propulsion device 3c.

Figure 12:
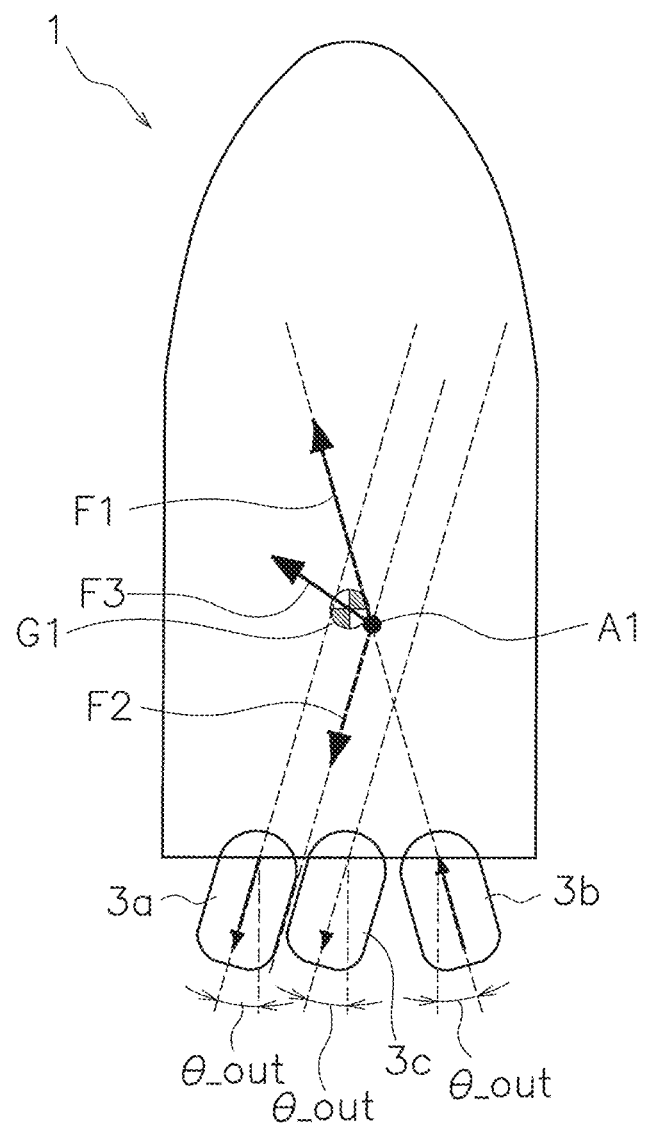
FIG. 12 a diagram showing the propulsive forces of the propulsion devices when the tilt direction of the joystick is diagonally forward left with the steering angle being corrected.

FIG. 12 is a diagram showing the propulsive forces when the tilt direction of the joystick 32 is diagonally forward left. When the tilt direction of the joystick 32 is diagonally forward left, the controller 33 calculates the correction angle γ by the above equation (4). Accordingly, as illustrated in FIG. 12, the steering angles of the propulsion device 3a to 3c are corrected to the corrected steering angle θ_out larger than the calibration angle θ_cali so that the resultant force F3 acts in the direction passing through the center of gravity G1.

Figure 13:
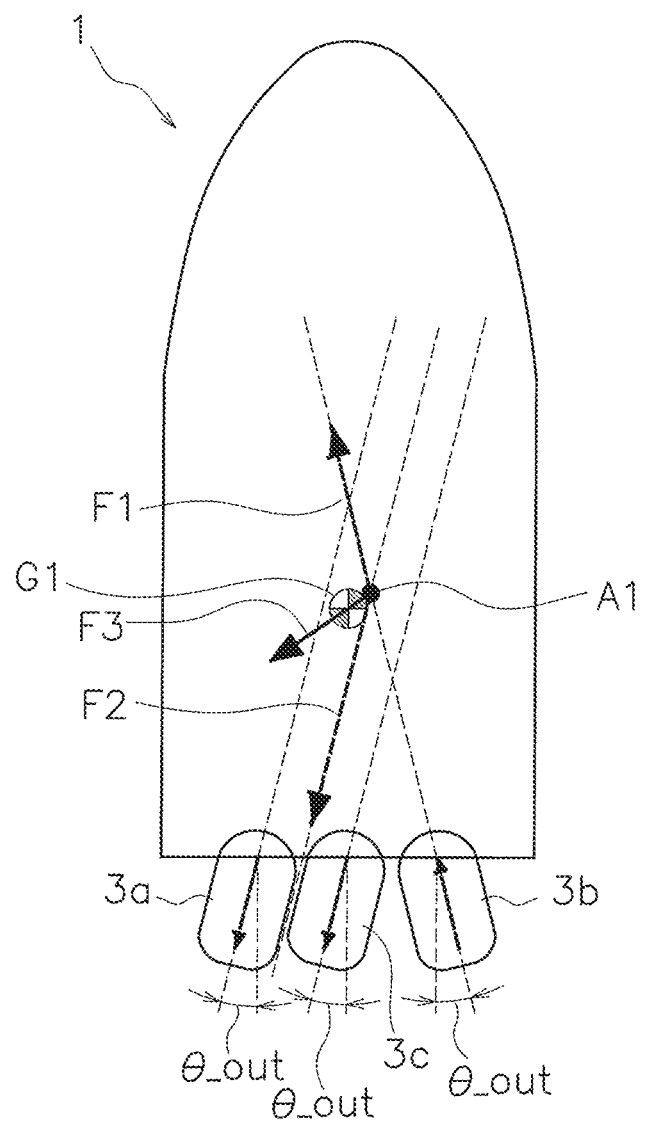
FIG. 13 is a diagram showing the propulsive forces of the propulsion devices when the tilt direction of the joystick is diagonally rearward left with the steering angle being corrected.

FIG. 13 is a diagram showing the propulsive forces when the tilt direction of the joystick 32 is diagonally rearward left. When the tilt direction of the joystick 32 is diagonally rearward left, the controller 33 calculates the correction angle γ by the above equation (5). Thus, as illustrated in FIG. 13, the steering angles of the propulsion device 3a to 3c are corrected to the corrected steering angle θ_out smaller than the calibration angle θ_cali so that the resultant force F3 acts in the direction passing through the center of gravity G1.

In the vessel steering system 2 according to the preferred embodiments described above, when the tilt direction of the joystick 32 is the oblique direction between the longitudinal direction and the lateral direction, the steering angles of the left propulsion device 3a, the right propulsion device 3b, and the central propulsion device 3c are corrected so that the resultant force of the propulsive forces of the left propulsion device 3a, the right propulsion device 3b, and the central propulsion device 3c acts in the direction passing through the center of gravity G1 of the vessel. Thus, when the vessel moves in an oblique direction, unintentional turning of the vessel is prevented.

Although preferred embodiments of the present invention have been described above, the present invention is not limited to the above-described preferred embodiments, a variety of changes can be made without departing from the gist of the present invention.

The number of propulsion devices 3a to 3c is not limited to three and may be four or more. For example, the vessel steering system may include four propulsion devices. When the tilt direction of the joystick 32 includes a right vector, the controller 33 controls the right three propulsion devices in the same manner as the right propulsion device 3b described above, and the left one propulsion device in the same manner as the left propulsion device 3a described above. When the tilt direction of the joystick 32 includes a left vector, the controller 33 may control the left three propulsion devices in the same manner as the left propulsion device 3a described above, and the right one propulsion device in the same manner as the right propulsion device 3b described above.

The propulsion devices 3a to 3c are not limited to outboard motors, and may be other types of propulsion devices such as inboard-outdrive motors. The configuration of the propulsion devices 3a to 3c is not limited to that of the above-described preferred embodiments, and may be changed.

The controller 33 is not limited to a single device, and may include a plurality of controllers. The processes in the lateral movement mode described above may be executed by being distributed to a plurality of controllers. A portion of the processes described above may be changed or omitted.

In the lateral movement mode, the central propulsion device 3c may not be inclined in the same direction as the left propulsion device 3a or the right propulsion device 3b. The controller 33 may set the steering angle of the central propulsion device 3c to a steering angle different from that of the left propulsion device 3a or the right propulsion device 3b.

The process to correct the steering angle is not limited to the above, and may be changed. For example, the controller 33 may acquire the position of the center of gravity G1 from an external device. The calculation method of the maximum corrected steering angle and/or the minimum corrected steering angle may be changed. The method to calculate the correction angle may be changed.

According to preferred embodiments of the present invention, in a vessel steering system including three or more propulsion devices, unintentional turning of the vessel is prevented when the vessel moves in an oblique direction.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vessel steering system comprising:
   a left propulsion device;
   a left actuator connected to the left propulsion device to change a steering angle of the left propulsion device;
   a right propulsion device;
   a right actuator connected to the right propulsion device to change a steering angle of the right propulsion device;
   a central propulsion device disposed between the left propulsion device and the right propulsion device;
   a central actuator connected to the central propulsion device to change a steering angle of the central propulsion device;
   a joystick operable in a tiltable manner; and
   a controller configured or programmed to:
      receive a signal indicative of a tilt direction of the joystick;
      when the joystick is tilted in a lateral direction, set the steering angle of the left propulsion device and the steering angle of the right propulsion device to directions opposite to each other in the lateral direction and inclined with respect to a longitudinal direction of the vessel, set the steering angle of the central propulsion device to a predetermined direction, and control propulsive forces of the left propulsion device, the right propulsion device, and the central propulsion device so that a direction of a resultant force of the propulsive forces of the left propulsion device, the right propulsion device, and the central propulsion device corresponds to the tilt direction of the joystick; and
      when the tilt direction of the joystick is an oblique direction between the longitudinal direction and the lateral direction, correct at least one steering angle of the left propulsion device, the right propulsion device, and the central propulsion device so that the resultant force of the propulsive forces of the left propulsion device, the right propulsion device, and the central propulsion device acts in a direction passing through a center of gravity of the vessel.

2. The vessel steering system according to claim 1, wherein the controller is configured or programmed to:
   acquire, as a calibration angle, the steering angles of the left propulsion device, the right propulsion device, and the central propulsion device to move the vessel in the lateral direction; and
   calculate a position of the center of gravity of the vessel from the calibration angle.

3. The vessel steering system according to claim 1, wherein the controller is configured or programmed to:
   acquire, as a calibration angle, the steering angles of the left propulsion device, the right propulsion device, and the central propulsion device to move the vessel in the lateral direction; and
   calculate a correction angle of the steering angles of the left propulsion device, the right propulsion device, and the central propulsion device from the calibration angle.

4. The vessel steering system according to claim 1, wherein the controller is configured or programmed to:
   determine, as a maximum value of a corrected steering angle, a steering angle in a direction from a turning center of the left propulsion device by the left actuator toward the center of gravity of the vessel when the controller sets the left propulsion device forward, sets the right propulsion device and the central propulsion device rearward, and sets the steering angle of the central propulsion device in a same direction as the steering angle of the right propulsion device.

5. The vessel steering system according to claim 1, wherein the controller is configured or programmed to:
   determine, as a minimum value of a corrected steering angle, a steering angle in a direction from a middle point between a turning center of the right propulsion device by the right actuator and a turning center of the central propulsion device by the central actuator toward the center of gravity of the vessel when the controller sets the left propulsion device forward, sets the right propulsion device and the central propulsion device rearward, and sets the steering angle of the central propulsion device in a same direction as the steering angle of the right propulsion device.

6. The vessel steering system according to claim 1, wherein the controller is configured or programmed to:
   determine, as a maximum value of a corrected steering angle, a steering angle in a direction from a turning center of the right propulsion device by the right actuator toward the center of gravity of the vessel when the controller sets the right propulsion device forward, sets the left propulsion device and the central propulsion device rearward, and sets the steering angle of the central propulsion device in a same direction as the steering angle of the left propulsion device.

7. The vessel steering system according to claim 1, wherein the controller is configured or programmed to:
   determine, as a minimum value of a corrected steering angle, a steering angle in a direction from a middle point between a turning center of the left propulsion device by the left actuator and a turning center of the central propulsion device by the central actuator toward the center of gravity of the vessel when the controller sets the right propulsion device forward, sets the left propulsion device and the central propulsion device rearward, and sets the steering angle of the central propulsion device in a same direction as the steering angle of the left propulsion device.

8. A method performed by a controller to steer a vessel including a left propulsion device, a right propulsion device, and a central propulsion device disposed between the left propulsion device and the right propulsion device, the method comprising:
receiving a signal indicative of a tilt direction of a joystick to steer the vessel;
when the joystick is tilted in a lateral direction, setting a steering angle of the left propulsion device and a steering angle of the right propulsion device to a direction opposite to each other in the lateral direction and inclined with respect to a longitudinal direction of the vessel, setting a steering angle of the central propulsion device to a predetermined direction, and controlling propulsive forces of the left propulsion device, the right propulsion device, and the central propulsion device so that a direction of a resultant force of the propulsive forces of the left propulsion device, the right propulsion device, and the central propulsion device corresponds to the tilt direction of the joystick; and
when the tilt direction of the joystick is an oblique direction between the longitudinal direction and the lateral direction, correcting at least one steering angle of the left propulsion device, the right propulsion device, and the central propulsion device so that the resultant force of the propulsive forces of the left propulsion device, the right propulsion device, and the central propulsion device acts in a direction passing through a center of gravity of the vessel.

9. The method according to claim 8, further comprising:
obtaining, as a calibration angle, the steering angles of the left propulsion device, the right propulsion device, and the central propulsion device to move the vessel in the lateral direction; and
calculating a position of the center of gravity of the vessel from the calibration angle.

10. The method according to claim 8, further comprising:
obtaining, as a calibration angle, the steering angles of the left propulsion device, the right propulsion device, and the central propulsion device to move the vessel in the lateral direction; and
calculating a correction angle of the steering angles of the left propulsion device, the right propulsion device, and the central propulsion device from the calibration angle.

11. The method according to claim 8, further comprising:
determining a steering angle in a direction from a turning center of the left propulsion device by the left actuator toward the center of gravity of the vessel as a maximum value of a corrected steering angle when setting the left propulsion device forward, setting the right propulsion device and the central propulsion device rearward, and setting the steering angle of the central propulsion device in a same direction as the steering angle of the right propulsion device.

12. The method according to claim 8, further comprising:
determining a steering angle in a direction from a middle point between a turning center of the right propulsion device by the right actuator and a turning center of the central propulsion device by the central actuator toward the center of gravity of the vessel as a minimum value of a corrected steering angle when setting the left propulsion device forward, setting the right propulsion device and the central propulsion device rearward, and setting the steering angle of the central propulsion device in a same direction as the steering angle of the right propulsion device.

13. The method according to claim 8, further comprising:
determining a steering angle in a direction from a turning center of the right propulsion device by the right actuator toward the center of gravity of the vessel as a maximum value of a corrected steering angle when setting the right propulsion device forward, setting the left propulsion device and the central propulsion device rearward, and setting the steering angle of the central propulsion device in a same direction as the steering angle of the left propulsion device.

14. The method according to claim 8, further comprising:
determining a steering angle in a direction from a middle point between a turning center of the left propulsion device by the left actuator and a turning center of the central propulsion device by the central actuator toward the center of gravity of the vessel as a minimum value of a corrected steering angle when setting the right propulsion device forward, setting the left propulsion device and the central propulsion device rearward, and setting the steering angle of the central propulsion device in a same direction as the steering angle of the left propulsion device.

* * * * *